C. E. TUCKER.
HEADING ATTACHMENT FOR CORN HARVESTERS.
APPLICATION FILED JULY 19, 1915. RENEWED OCT. 3, 1918.
1,294,323.
Patented Feb. 11, 1919.
2 SHEETS—SHEET 1.
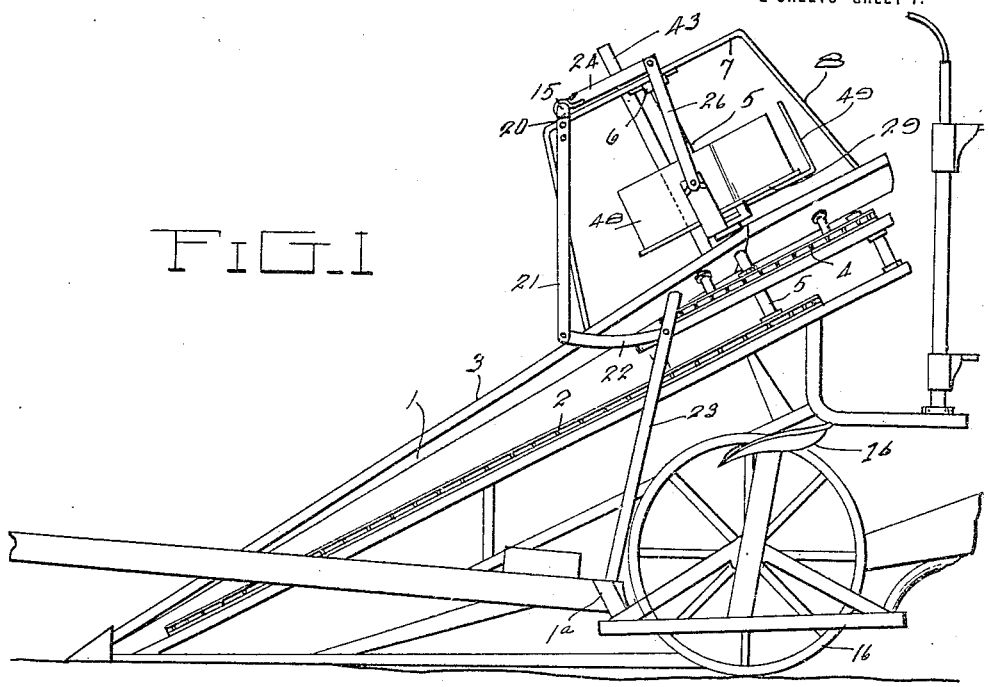
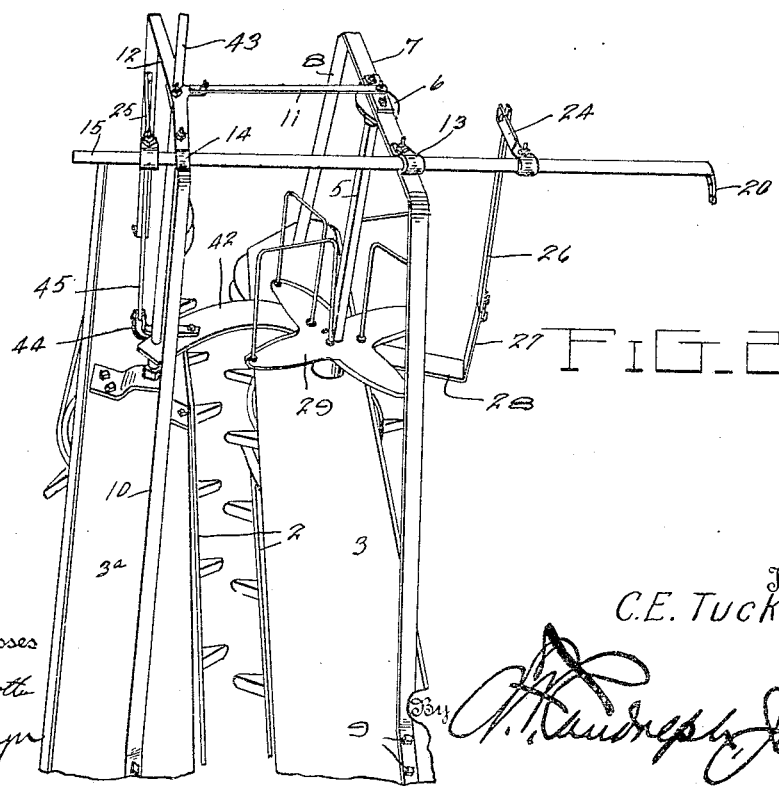
Inventor
C. E. Tucker

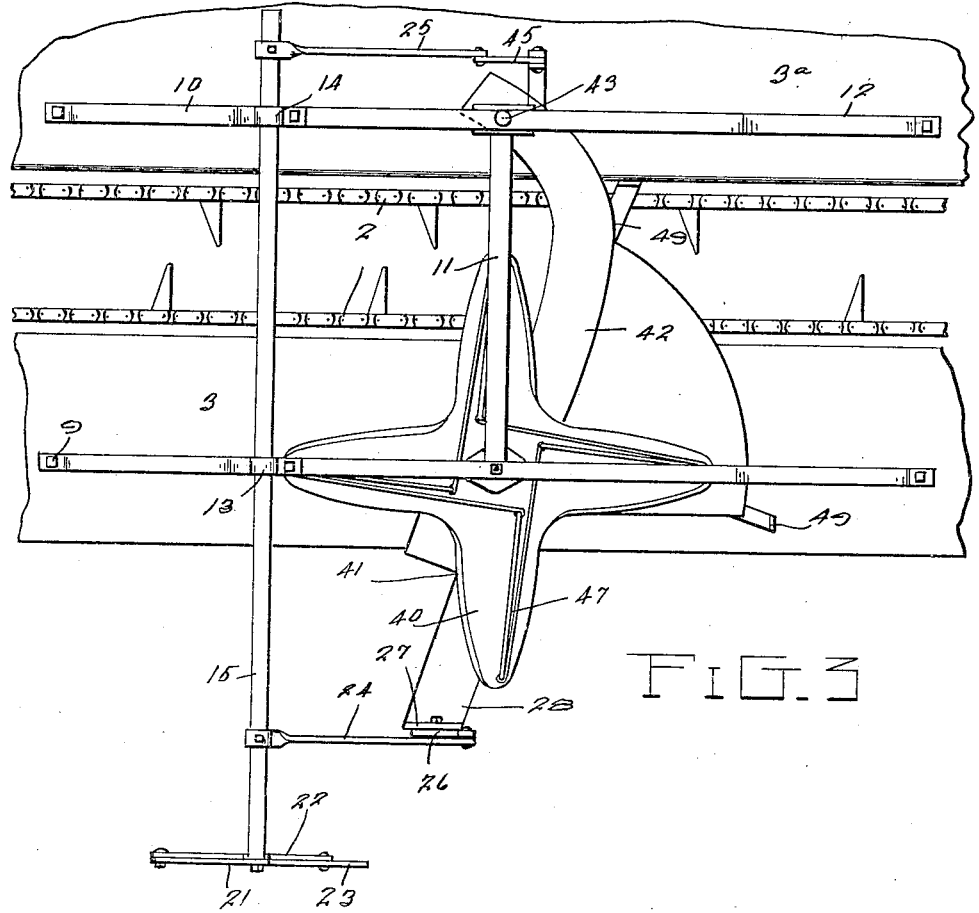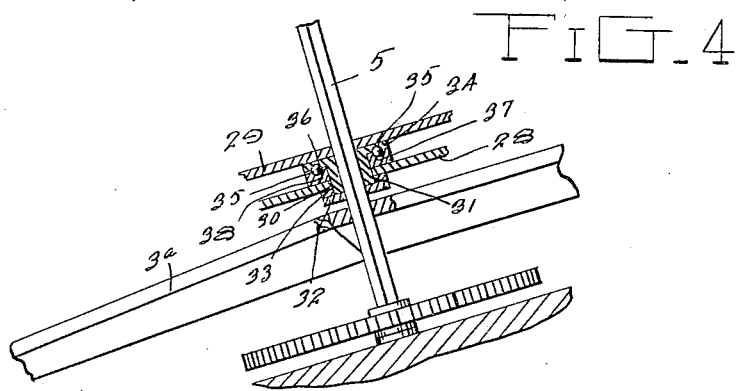

UNITED STATES PATENT OFFICE.

CHARLES E. TUCKER, OF ROOSEVELT, OKLAHOMA.

HEADING ATTACHMENT FOR CORN-HARVESTERS.

1,294,323.  Specification of Letters Patent.  Patented Feb. 11, 1919.

Application filed July 19, 1915, Serial No. 40,658. Renewed October 3, 1918. Serial No. 256,759.

*To all whom it may concern:*

Be it known that I, CHARLES E. TUCKER, a citizen of the United States, residing at Roosevelt, in the county of Kiowa and State of Oklahoma, have invented certain new and useful Improvements in Heading Attachments for Corn-Harvesters; and I do hereby declare the following to be a full, clear, and exact description of the invention, such as will enable others skilled in the art to which it appertains to make and use the same.

This invention relates to an attachment for corn harvesters of any ordinary construction, and the primary object of the invention is to provide a rotary knife, having a plurality of radiating blades which travel over a permanent or rigid blade above the guiding boards or deck of the corn harvester, for topping corn, maize, Kafir corn or the like.

Another object of this invention is to provide means for raising or lowering the topping structure, for regulating the length of the tops cut from the grain stalk, and further to increase the length of the rectangular shaft of one of the compression chains of the harvester, and to mount the rotary cutting or topping knife upon this shaft for rotation therewith.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of a corn harvester, showing the improved topping attachment applied thereto, Fig. 2 is a perspective view of the attachment, showing it applied to a fragment of a binder, Fig. 3 is a plan view of a part of the topping structure, and Fig. 4 is a sectional view through the bearing portion of the rotary cutting knife.

Referring more particularly to the drawings, 1 designates a corn harvester of any ordinary construction, which includes elevating or guiding chains 2, protecting decks or boards 3 and 3ª, such as is ordinary in the construction of corn harvesters. The corn harvester structure 1 also includes compression chains 4, one of which is rotated by a sprocket, which is mounted upon the rectangular shaft 5. The rectangular shaft 5 has its length increased, and it extends upwardly above the deck or board 3, and has its upper end rotatably mounted in a bearing 6 which is carried by the top cross-piece 7 of a frame-work 8. The frame-work 8 is substantially the shape of an inverted U, and is constructed of bar iron, having the ends of its legs bent for lying in facial abutment with the upper surface of the board 3, to which they are secured by means of bolts or analogous fastening devices 9.

The other board 3ª, has a frame 10 secured thereto, which extends upwardly therefrom and is identical in shape to the frame 8, which supports the bearing 6. The frames 8 and 10 are connected and braced by a cross brace 11.

The upper sections 7 and 12 of the brackets 8 and 10 respectively, have bearings 13 and 14 secured to their upper surfaces, which bearings rotatably support a rock shaft 15. The rock shaft 15 extends beyond each of the members 8 and 10, and beyond the outer edge of the traction wheel 16 of the corn harvester. The rock shaft 15 has one end flattened and bent downwardly, as is clearly shown at 20. A bar 21 is connected to the angled end 20 of the rock shaft 15, and it extends downwardly therefrom, having its lower end connected to a bar 22, which is slightly arcuate in shape, and extends rearwardly from the lower end of the bar 21. The bar 22 has its rear end connected to the upper end of a lever 23, which is pivotally connected to the frame 1ª of the corn harvester, and extends upwardly from its pivotal point, to a position for convenient access by a person seated upon the seat 1ᵇ.

The rock shaft 15 has arms 24 and 25 secured thereto, and extending rearwardly therefrom. The arm 24 has a bar 26 connected to its end remote from the rock shaft 15, which bar is in turn connected to the upturned end 27 of the supporting plate 28. The plate 28 supports the rotary knife 29.

The plate 28, which is mounted upon the rectangular shaft 5, is provided with a centrally disposed opening 30, through which the lower end of a bearing sleeve 31 extends. The bearing sleeve 31 has a collar or washer 32 secured to its rear or lower end, which washer abuts the under surface of a washer 33, which is placed against the under surface of the plate 28, and encompasses the sleeve 31.

The sleeve 31 has an enlarged head 34 formed upon its upper end, in which is formed a ball race 35. Ball bearings 36, of ordinary construction, are mounted in the ball race 35, and in a ball race 37, which is formed in the upper surface of a washer or collar 38, which is mounted upon the upper surface of the plate 28, as is clearly shown in Fig. 4 of the drawings. The enlarged head 34 is secured to the rotary knife member 29, thereby rotatably supporting the knife structure 29 above the supporting plate 28, for rotation with the rotation of the rectangular shaft 5.

The rotary cutting member 29 has a plurality of radially extending cutting blades 40, which have their forward edges sharpened, as is shown at 41, for co-acting with the edge of the stationary cutting member 42, for topping various types of grain stalks.

The stationary cutting member 42 is arcuate in shape and positioned substantially parallel with the up-and-down incline of the decks or boards 3 and 3$^a$ of the harvester. The member 42 spans the opening between the facing edges of the boards 3 and 3$^a$, as is clearly shown in Fig. 2 of the drawings, and it has its end which is remote from the shaft 5, slidably mounted upon a vertical rod 43. The rod 43 has its lower end secured to a bracket 44, which is in turn secured to and supported by the upper surface of the board 3$^a$. The upper end of the vertical rod 43 is carried by the top cross-piece 12 of the frame 10.

The member or blade 42 has a pair of bars 44 secured thereto, and extending beyond the edge of the blade or member in close proximity to the vertical rod 43. The bars 44 have their outer ends bent upwardly and spaced from each other for receiving therebetween the lower end of a bar 45. The bar 45 extends upwardly from the blade 42 and is connected to the end of the lever 25, which is remote from the rock shaft 15. When the shaft 15 is rocked by the oscillatory or swinging movement of the lever 23, the arms 24 and 25 will be moved correspondingly with the rocking of the shaft 15, which will move their outer ends in an arc, either raising or lowering these ends, which will, owing to their connection to the member 42 and the plate 28, slide the topping structure upwardly along the shaft 5 and the rod 43, or downwardly thereon, depending upon the direction in which the shaft 15 is rocked.

The blades 40, of the rotary cutting member or knife 29, have a plurality of upstanding rods 47 connected thereto, to which are attached metallic plates, indicated at 48, for receiving the cut or severed tops, and carrying them around for deposit in any suitable type of a conveyer, which may be attached to the rotary structure, by means of the angled brace bars 49.

In the operation of the improved topper, when the corn, maize, Kafir corn or the like, is engaged by the guiding or carrying chains 2, of a corn harvester, it will be fed upwardly between the boards 3 and 3$^a$, until the tops of the stalks engage the blade 42, which has its forward edge curved, for guiding the tops of the stalks toward the central axis of the rotary cutting blade 29. The rotation of the shaft 5 will operate the compressor chains 4 of the harvester, and will rotate the rotary cutting blade or member 29, which will bring the sharpened edges of the knives or blades 40 over the upper surface of the blade 42, severing the tops from the stalks. The upstanding plates 48 will receive the tops which have been severed and carry them about with the blades, until they are received by any suitable type of a conveyer, which may be attached to the braces 49, whence they are conveyed to a wagon or any suitable structure. The length of the tops cut off may be regulated by the rocking of the shaft 15, which will shift the position of the topping structure upon the substantially vertical shaft 5 and rod 43.

From the foregoing description taken in connection with the accompanying drawings the advantages of construction and of the method of operation of the improved heading attachment for corn harvesters will be readily apparent to those skilled in the art to which this invention appertains and, while in the foregoing description, the principle of the operation of this invention has been described, together with various features of construction, it is to be understood that certain minor features of construction, combination and arrangement of parts may be altered to suit practical conditions provided such alterations are comprehended within the scope of what is claimed.

What is claimed is:—

The combination with an ordinary corn harvester including a pair of spaced deck boards, a pair of substantially vertical rectangular shafts carried by said deck boards, one of said shafts projecting downwardly through one of said deck boards and being operatively connected to the corn harvester operating means for rotating the shaft upon operation of the corn harvester, a cutting knife having a concave cutting surface supported above said deck boards and spanning the space between their facing edges, said knife being mounted for vertical movement, said rectangular shafts acting as guides for the vertical movement of said knife, a rotary cutting member mounted upon the rectangular shaft which is operatively connected to the corn harvester operating means for rotation with the shaft and for vertical movement along the shaft, said rotary cutting member mounted for movement over said cutting knife, said knife having an extension formed thereon and extending outwardly beyond said rotary cutting member, an upstanding portion formed upon the terminal of said extension, a bar connected to said upstanding portion, a pair of bearings carried by and extending upwardly over said deck boards, a rock shaft carried by said bearing support, an arm attached to said rock shaft and being connected to said bar for moving said knife vertically upon rocking movement of said rock shaft, a bar connected to one end of said rock shaft, a second arcuate bar connected to the lower end of said last named bar, a hand lever pivotally carried by the frame of the corn harvester and connected to said arcuate bar for rocking said rock shaft upon pivotal movement of said hand lever.

In testimony whereof I affix my signature in presence of two witnesses.

CHARLES E. TUCKER.

Witnesses:
R. R. ROOT,
CLEOPHUS P. LEE.

Copies of this patent may be obtained for five cents each, by addressing the "Commissioner of Patents, Washington, D. C."